(No Model.)
G. O. KEITER.
Meat and Vegetable Cutter.
No. 236,038. Patented Dec. 28, 1880.
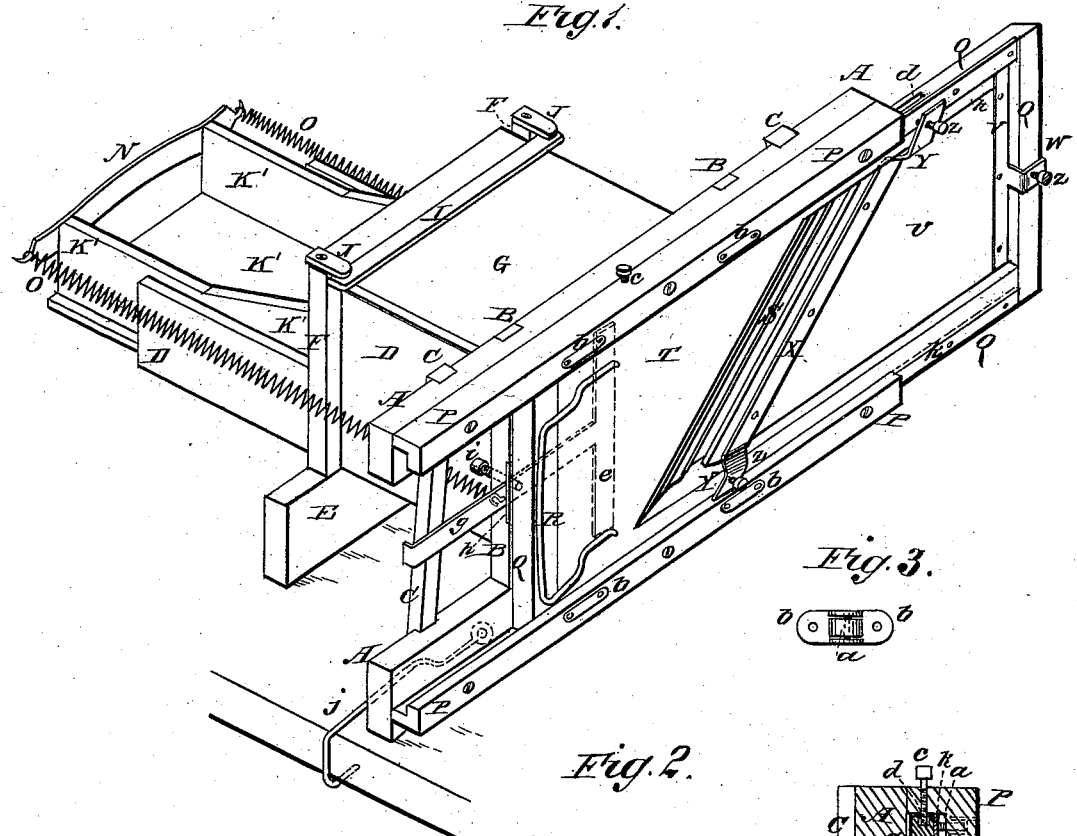
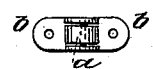
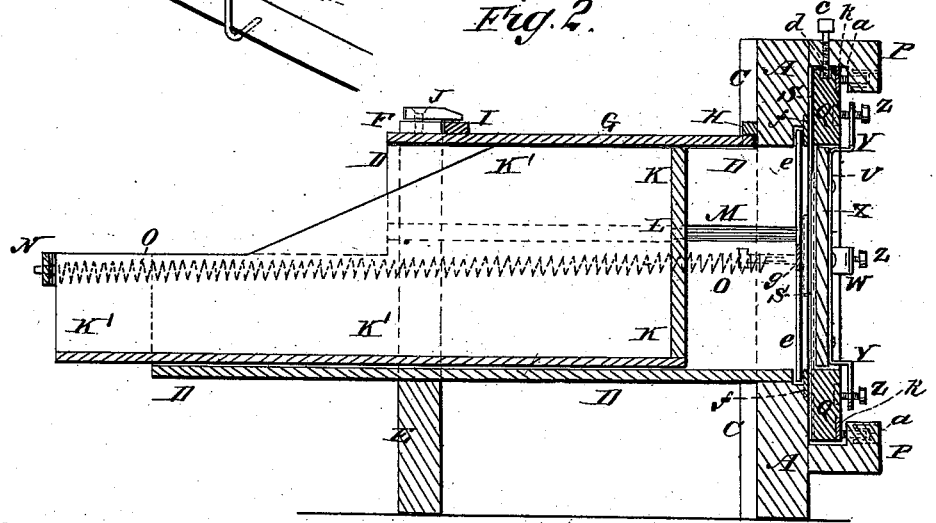
WITNESSES:
Francis McArdle
C. Sedgwick
INVENTOR:
G. O. Keiter
BY Munn & Co
ATTORNEYS.

UNITED STATES PATENT OFFICE.

GEORGE O. KEITER, OF SPRING CITY, PENNSYLVANIA, ASSIGNOR TO SUSANNA KEITER, OF SAME PLACE.

MEAT AND VEGETABLE CUTTER.

SPECIFICATION forming part of Letters Patent No. 236,038, dated December 28, 1880.

Application filed September 9, 1880. (No model.)

*To all whom it may concern:*

Be it known that I, GEORGE OLIVER KEITER, of Spring City, in the county of Chester and State of Pennsylvania, have invented a new and useful Improvement in Meat and Vegetable Cutters, of which the following is a specification.

Figure 1 is a perspective view of the improvement. Fig. 2 is a sectional elevation. Fig. 3 represents one of the friction-rollers.

Similar letters of reference indicate corresponding parts.

The object of this invention is to furnish meat and vegetable cutters so constructed that the substances to be cut will be fed to the knives automatically, that the cutters can be adjusted to cut thicker or thinner slices, and can be used to slice substances smaller than the cavities of the feed-boxes.

The invention consists in constructing a meat and vegetable cutter of a peculiar framework to support the operating mechanism, a feed-box having an open top to receive the substance to be cut, a detached cover to keep the substance to be cut from rising out of the box, a feed-slide and spiral springs to push the substance to be cut forward, rabbeted bars, a sliding knife-frame having handle, inclined knife, stationary plate, and adjustable gage-plate, and a strap having bent lug, a strap having bent ends, and swiveled screws for adjusting the gage-plate, as will be hereinafter fully described.

In the accompanying drawings, A are two bars connected by two posts, B, framed to them upon the opposite side of and equally distant from their centers, and by two strengthening posts or braces, C.

To the bars A and posts B is attached the forward end of the feed-box D, the outer part of which is attached to the bar E and posts F, framed at their lower ends into the said bar E. The top G of the feed-box D is detachable, and rests upon the upper edges of the sides of the said feed-box D. The forward end of the top or cover G fits and rests beneath a cleat, H, attached to the side of the top bar, A.

To the upper side of the outer part of the cover G is attached a cross-bar, I, in such a position that its ends will project at the forward sides of the posts F, so that the outer part of the said cover G can be secured in place by buttons J, pivoted to the tops of the said posts F and turned over the projecting ends of the said bar I.

The lower half of the sides of the feed-box D projects beyond the posts F, to serve as a guide and guard to the feed-slide K. The feed-slide K is made to fit the interior of the feed-box D, and is attached to the forward end of a box, K', made with its upper side and outer end open, and with the outer part of its sides about half the height of the inner half, as shown in Fig. 2, the shoulders between said higher and lower parts being inclined.

Upon the sides of the forward end of the feed-slide K are formed tenons or tongues L, which fit into and slide in grooves M in the inner surfaces of the sides of the feed-box D, to cause the feed-slide to move out and in in a straight line.

To the center of the outer end of the feed-slide K K' is attached a cross-bar, N, the ends of which project beyond the sides of the feed-box D, and to them are attached the outer ends of two spiral springs, O. The inner ends of the spiral springs O are secured to the posts B by hooks or other suitable means, so that the feed-slide K K' will be drawn forward by the tension of the said springs O. The middle part of the cross-bar N serves as a handle, for convenience in drawing back the feed-slide K to insert the substance to be sliced.

To the forward or outer sides of the bars A are attached rabbeted bars P, to form a way for the knife-frame Q, to which, near one end, is attached a handle, R, for convenience in operating it.

To the middle part of the inner side of the frame Q is attached the knife S, which is set in an inclined position, and is let into the frame Q, so that its surface may be flush with the surface of the said frame Q. The cavity of the frame Q in the rear of the knife S is filled with a plate, T, securely attached to the said frame, and having its inner surface flush with the surface of the frame Q and knife S. The forward edge of the plate T, beneath the knife S, is beveled to allow the slices cut by the said knife S to escape freely.

The cavity of the knife-frame Q in front of the knife S is filled with a plate, U. The plate U is fitted loosely into the frame Q, and its forward edge, beneath the edge of the knife S, is inclined to correspond with the inclination of the said knife S, and is beveled upon its outer side, so that it will not interfere with the free escape of the slices cut by the said knife S.

To the outer side of the outer end of the plate U is attached a metal bar, strap, or narrow plate, V, upon the middle part of which is formed a lug, W. The lug W projects at right angles with the plate V, and is bent outward at right angles, so as to overlap the outer side of the end bar of the knife-frame Q.

To the outer side of the inclined inner end of the plate U is attached a strap, bar, or plate, X, the ends or lugs Y of which project and are bent twice at right angles, so as to overlap the side bars of the frame Q. To the lug W of the strap V and to the ends Y of the strap X are swiveled hand-screws Z, which screw into nuts set into and secured to the bars of the knife-frame Q, so that by turning the screws Z the plate U may be adjusted at a greater or less distance from the plane of the knife S, according as thicker or thinner slices are to be cut.

With this construction, when the knife-frame Q is pushed forward the substance to be cut is pressed against the plate T by the tension of the springs O, which tension, when the knife-frame Q is drawn back, forces the substance to be cut against the adjustable plate U, so that a slice will be cut from the said substance by the knife S as the knife-frame Q is again pushed forward. The friction of the knife-frame Q against the rabbeted bars P, caused by the pressure of the substance to be cut against the plates T U, is relieved by the friction-rollers $a$, pivoted to the lugs formed upon the side edges of the small plates $b$, let into and secured to the said rabbeted bars P, the rollers $a$ projecting through the short slots in the said rabbeted bars P, so that the facing-plates $k$, attached to the outer sides of the side bars of the knife-frame Q, will rest against the faces of the said rollers $a$. The movement of the knife-frame Q is limited by a set-screw, $c$, which passes through a screw-hole in the rabbeted bar P, so that its forward end will enter a groove, $d$, in the edge of a side bar of the frame Q.

The inner sides of the forward edges of the forward end of the feed-box D are rabbeted to receive a narrow plate, $e$, which is kept in place by narrow plates $f$, which cross the ends of the said plate $e$, and form ways for the said plate $e$ to move upon. To the center of the plate $e$ is attached, or upon it is formed, an arm, $g$, to serve as a handle for adjusting the plate $e$. The arm $g$ passes through a keeper, $h$, attached to the post B, and projects into such a position as to be conveniently reached and operated. The plate $e$ is designed to be used when cutting a substance of smaller bulk than the cavity of the feed-box D, to prevent the said substance from being drawn back or turned by friction when drawing back the knife-frame for another cut, in which case the plate $e$ is adjusted in such a position as to hold the substance to be cut against the forward side of the feed-box. The plate $e$ is secured in place when adjusted by a set-screw, $i$, which passes through the post B and presses the arm $g$ against the keeper $h$. When not required for use the plate $e$ is drawn back into a rabbet in the edge of the rear side of the feed-box D, so as to be wholly outside of the cavity of the said feed-box.

To the rear part of the lower bar, A, is hinged a hook, $j$, to be hooked upon the edge of the table or bench upon which the cutter rests when being used to sustain the said cutter against the forward pressure when making a cut.

Having thus described my invention, I claim as new and desire to secure by Letters Patent—

The combination, in a meat and vegetable cutter, with the frames A B C and E F, of the grooved feed-box D G, the spring-actuated and tenoned feed-slide K, having cross-bar N, the box K', open at the upper side and outer end, the rabbeted bars P, the frame Q, carrying the inclined knife S, the plate T, beveled on the forward edge, the plate V, having lug W, the loose plate U, inclined on the forward edge, the strap X, having lugs Y, and the adjusting-screws Z, as shown and described.

GEORGE OLIVER KEITER.

Witnesses:
AMOS KEITER,
GEORGE W. QUAY.